United States Patent [19]

Downer et al.

[11] Patent Number: 5,501,035
[45] Date of Patent: Mar. 26, 1996

[54] TRELLIS WIRE SUPPORT ASSEMBLY

[75] Inventors: John S. Downer, Santa Rosa; Paul A. Downer, Sebastopol, both of Calif.

[73] Assignee: Vineyard Industry Products Co., Windsor, Calif.

[21] Appl. No.: 163,044

[22] Filed: Dec. 8, 1993

[51] Int. Cl.⁶ ............................ A01G 17/06; A01G 17/14
[52] U.S. Cl. .................................................. 47/47; 256/57
[58] Field of Search ................................. 47/47 S, 47 L, 47/46 R; 256/57, 47

[56] References Cited

U.S. PATENT DOCUMENTS

| | | | |
|---|---|---|---|
| 115,662 | 6/1871 | Underhill . | |
| 459,019 | 9/1891 | Roberts | 256/57 |
| 1,060,593 | 5/1913 | Green . | |
| 1,712,752 | 5/1929 | Dandliker | 256/57 |
| 1,761,452 | 6/1930 | Paque | 256/47 |
| 1,851,224 | 3/1932 | Weber . | |
| 2,227,553 | 1/1941 | Paque | 256/57 |
| 3,169,750 | 2/1965 | Weed | 256/57 |
| 4,099,299 | 7/1978 | Bruggert et al. . | |
| 4,270,581 | 6/1981 | Claxton et al . | |
| 4,619,440 | 10/1986 | Thévenin et al. | 256/47 |
| 5,144,768 | 9/1992 | Hiyama et al. . | |

FOREIGN PATENT DOCUMENTS

| | | | |
|---|---|---|---|
| 524039 | 5/1931 | German Dem. Rep. | 47/46 R |
| 2703055 | 7/1978 | Germany | 47/46 R |

OTHER PUBLICATIONS

French Brochure by SCDC.

Primary Examiner—Terry Lee Melius
Assistant Examiner—Joanne C. Downs
Attorney, Agent, or Firm—Flehr, Hohbach, Test, Albritton & Herbert

[57] ABSTRACT

A trellis wire support assembly (21) including a first wire member (22) formed of a pair of arms (24,26) dimensioned to extend outwardly of opposite sides (27,28) of the grape stake (23) and a second wire member (33) formed to secure the first wire member to the stake (23). The arms on the first wire member (22) include a support arm portion (31) and vertically-superimposed retention arm portion (51) that extends back over the support arm portion (31) to trap and retain the trellis wires (32a,32b) against upward forces and/or force reversals due to wind loading and the like. The second wire member (33) is plastically deformed to cinch and securely fasten the first wire member (22) to the grape stake (23).

4 Claims, 3 Drawing Sheets

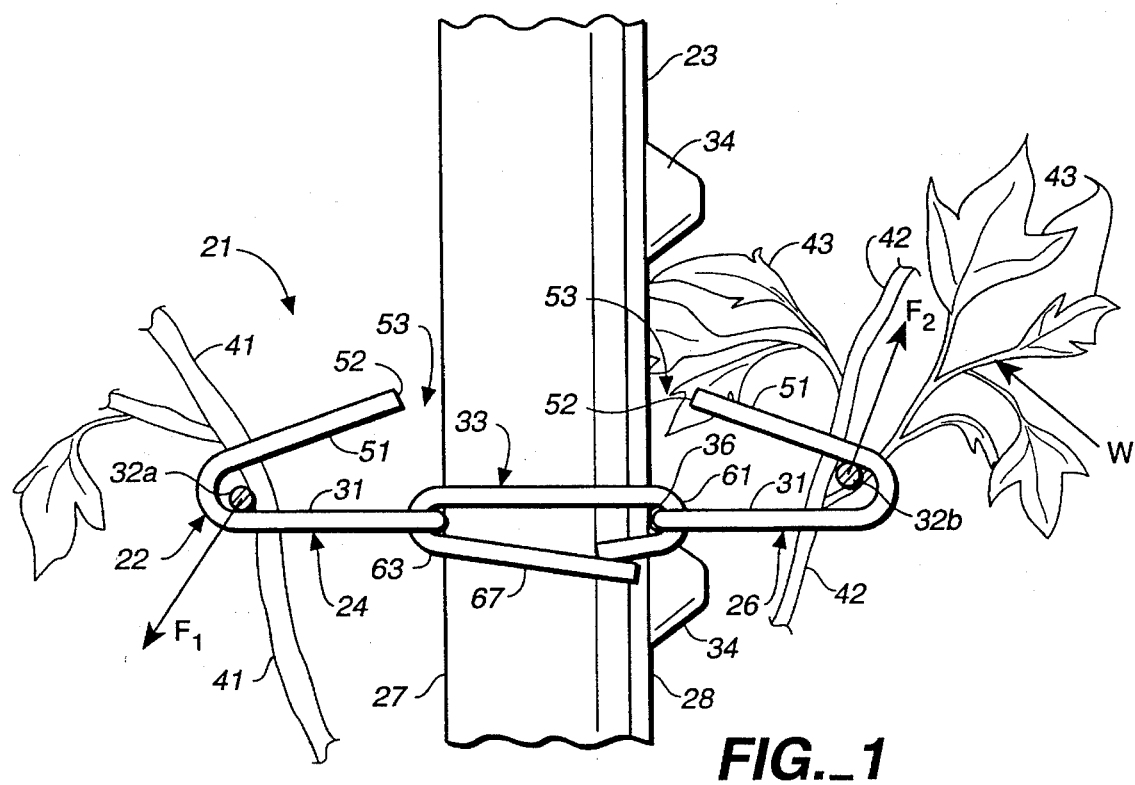
FIG._1
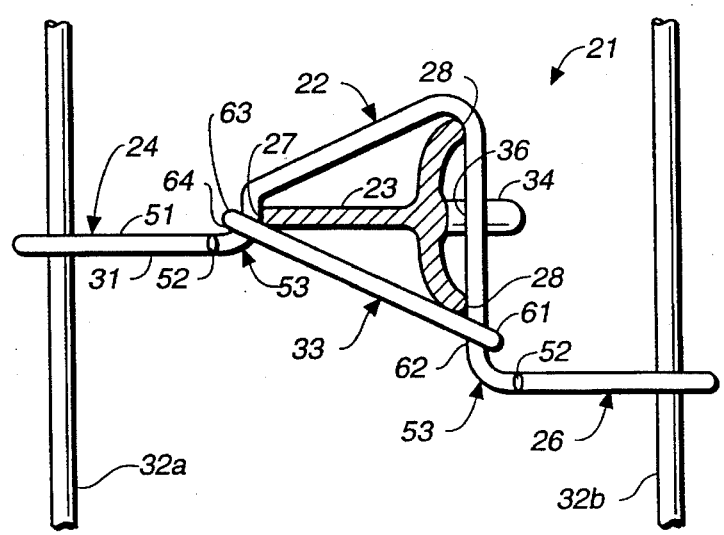
FIG._2

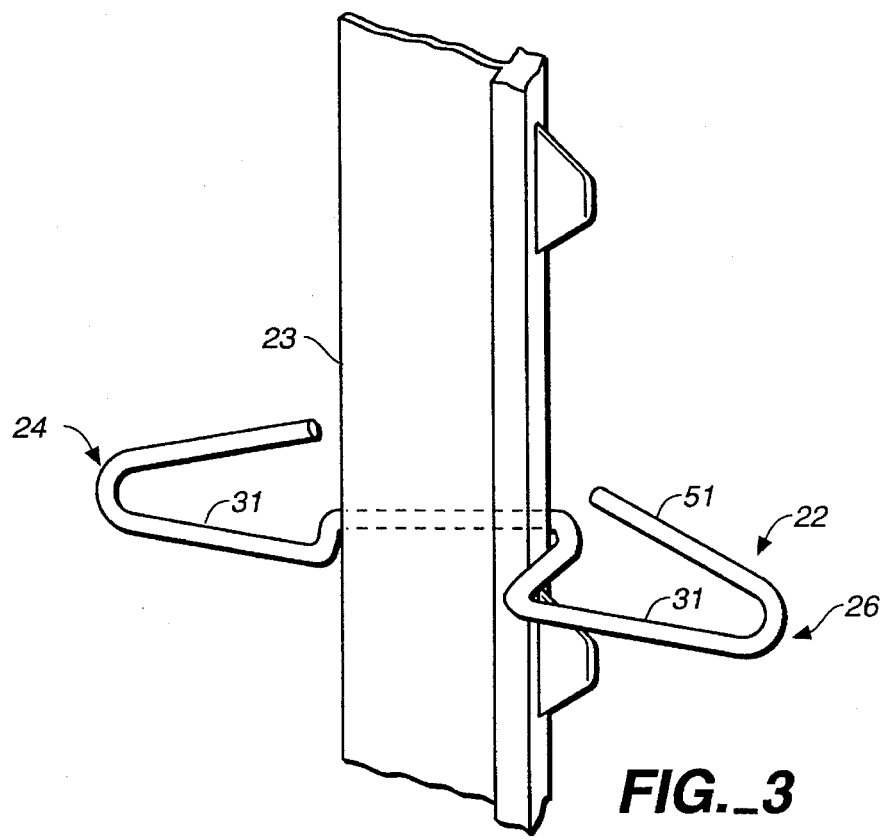
FIG._3
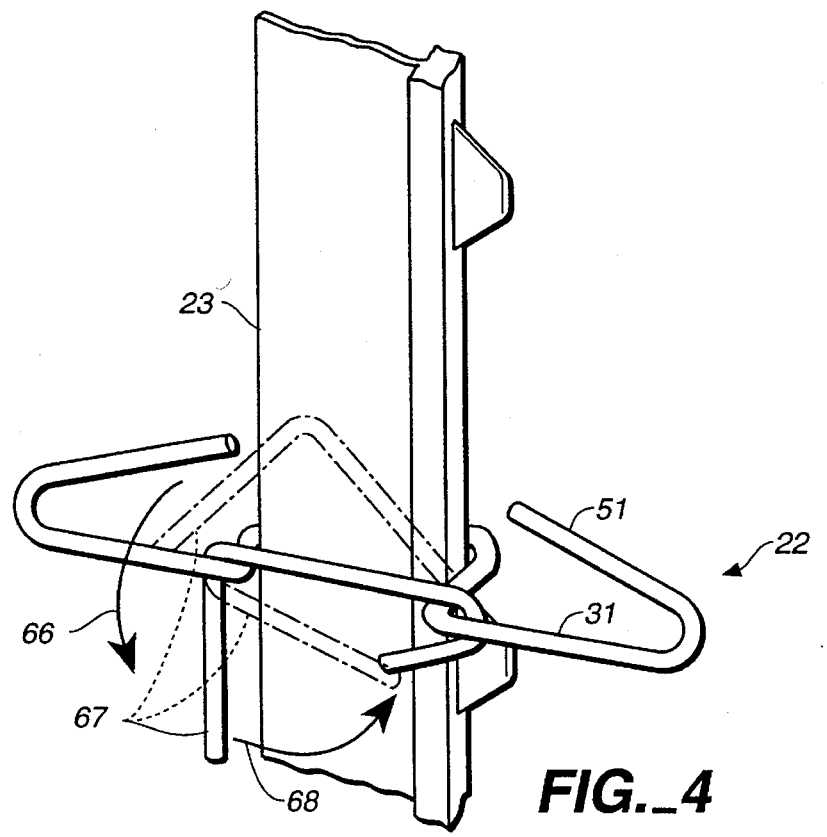
FIG._4

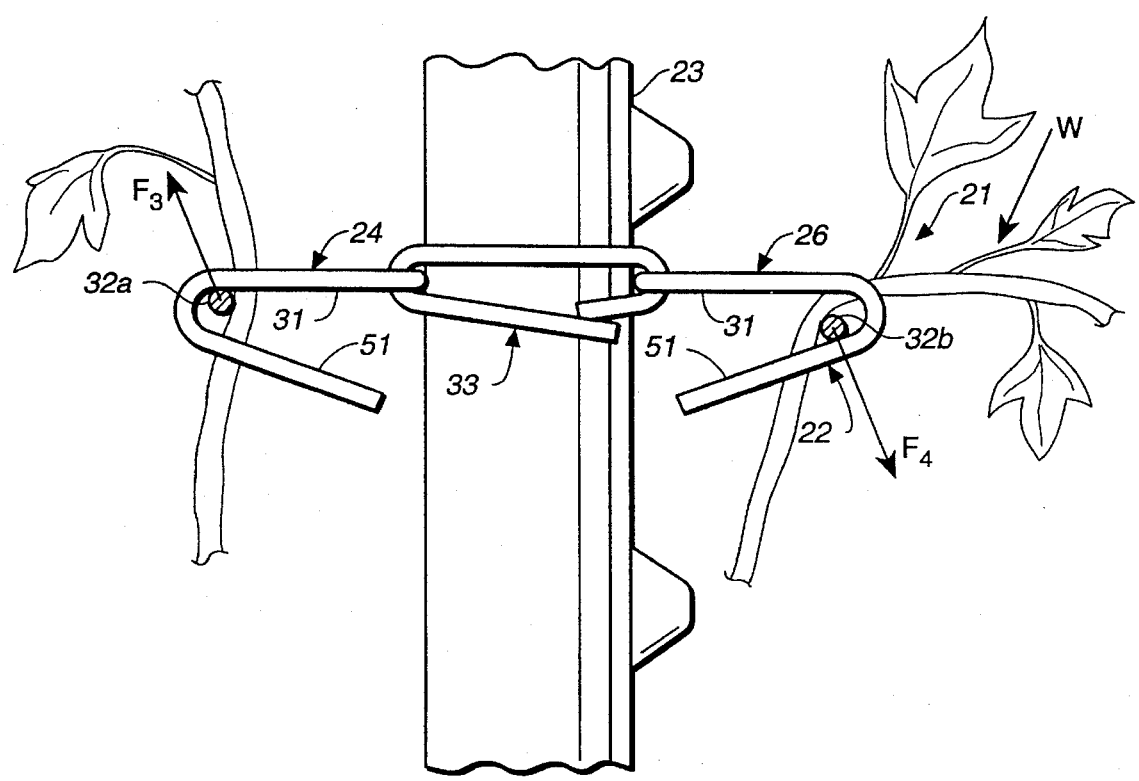
FIG._5

5,501,035

TRELLIS WIRE SUPPORT ASSEMBLY

TECHNICAL FIELD

The present invention relates, in general, to support assemblies used to support trellis wires from grape stakes, and more particularly, to wire-based support assemblies used in vertical grapevine trellising.

BACKGROUND OF ART

In recent years, the vertical trellising of grapevines has become more important, particularly in connection with varieties such as Chardonay, for which it is advantageous to support the foliage in an elevated position relative to the grapes or berries. So-called "vertical" trellising systems employ a pair of trellis wires which are positioned with one wire lying on the ground at the base of each side of the grape stakes along the row of vines. After the foliage is nearly fully formed and the berries begin to form, the trellis wires are lifted from the base of the stakes to a support device, such as a transversely-extending armor wire assembly mounted on the grape stakes. As the trellis wires are raised, they catch the grapevine foliage and move it to an elevated position above the berries. This exposes the berries to more direct sunlight, which is helpful to berry development.

Trellis wires have been supported from grape stakes for vertical trellising using both short, transversely-extending metal arms and wire-based support assemblies. Such metal arms usually have openings which receive the trellis wire, and one example of a metal trellis wire support arm used in vertical trellising is shown in U.S. Pat. No. 4,965,961 to Broyles. Another more elaborate metal arm trellising system is disclosed in U.S. Pat. No. 5,144,768 to Hiyama.

Two prior art wire-based trellis wire support assemblies which have been used, particularly in France, are shown in the brochure of SCDC, a French trellising hardware company. These wire-based assemblies are formed with transversely-extending wire arms that terminate in upwardly-extending ends to provide a goal post-like structure over which the trellis wires may be laid and supported. Other wire-based trellis wire support assemblies found in the patent literature include U.S. Pat. Nos. 115,662, 1,060,593, 1,851,224, 4,099,299 and 4,270,581.

The number of trellis wire support assemblies required for vertical trellising makes it highly advantageous to be able to reduce the cost of manufacturing and supporting trellis wires from grape stakes. Wire-based support assemblies have an inherent cost advantage over stamped metal arms or clips. Such wire-based support assemblies, however, also have experienced various disadvantages such as tedious and costly installation, an inability to easily mount and remove the trellis wires from the wire support assembly, and an inability to retain the trellis wires when an upward loading force is present on the wires. This latter problem is present in the French wire-based assemblies and the assembly of U.S. Pat. No. 1,060,593. Since many vineyards are in rolling terrain, the trellis wires which extend down into valleys or depressions are loaded in an upward direction. Moreover, the wind loading on foliage can be substantial and can lift the foliage and the trellis wires out of goal post-type trellis wire support assemblies.

Accordingly, it is an object of the present invention to provide a wire-based trellis wire support assembly which is low in cost and yet capable of retaining trellis wires against both upward and downward loading.

Another object of the present invention is to provide a wire-based trellis wire support assembly which can be installed in rolling terrain on both knolls and valleys for vertical trellising of grapevines.

Still a further object of the present invention is to provide a trellis wire support assembly to which movable trellis wires can be easily mounted and easily removed.

A further object of the present invention is to provide a wire-based trellis wire support assembly which can be easily installed on grape stakes using simple tools and yet provides a durable, low maintenance, high strength structure.

The trellis wire support assembly of the present invention has other objects and features of advantage which will become apparent from, and are set forth in more detail in, the accompanying drawing and the following Description of the Best Mode of Carrying Out the Invention.

DISCLOSURE OF INVENTION

The wire-based trellis wire support assembly of the present invention includes a first wire member formed with a pair of arms dimensioned to extend outwardly of opposite sides of a grape stake. The arms each include an outwardly-extending support arm portion for support of a trellis wire thereon and a distal end, defining with the grape stake, a trellis wire-receiving opening. A second member, preferably a wire member, is formed for and coupled to the first wire member to secure the first wire member to the grape stake.

The improvement in the trellis wire support assembly of the present invention comprises, briefly, the arms on the first wire member each further including a retention arm portion extending vertically and inwardly from the support arm portion toward the grape stake in a vertically-spaced relation with respect to the support arm portion over an inwardly extending distance sufficient to retain the trellis wire between the support arm portion and the retention arm portion for both an upright and an inverted mounting orientation of the trellis wire support assembly on the grape stake. In the preferred form, the retention arm portion extends inwardly back toward the grape stake by a distance greater than one-half the distance which the support arm portion extends away from the grape stake and the retention arm portion and the support arm portion are in substantially superimposed relation.

DESCRIPTION OF THE DRAWING

FIG. 1 is a front elevation view of a wire-based trellis wire support assembly constructed in accordance with the present invention and mounted on a T-post grape stake.

FIG. 2 is a top elevation view of the trellis wire support assembly of FIG. 1.

FIG. 3 is a reduced, perspective view showing a first wire member of the assembly of FIG. 1 mounted to the grape stake.

FIG. 4 is a reduced, perspective view showing mounting of a second wire member to the first wire member to form the assembly of FIG. 1.

FIG. 5 is a front elevation view corresponding to FIG. 1 with the wire-based trellis wire support assembly mounted in an inverted orientation on the grape stake.

BEST MODE OF CARRYING OUT THE INVENTION

The wire-based trellis wire support assemblies of the present invention are particularly well suited for use in rolling terrain for the vertical trellising of grapevines. Even in relatively flat terrain, the trellis wire support assemblies of the present invention have substantial cost advantages and are highly effective in resisting detachment of the trellis wires during wind loading.

Referring now to FIGS. 1 and 2, the wire-based trellis wire support assembly of the present invention, which is generally designated 21, can be seen to be comprised of two members. A first wire member 22 extends around grape stake 23 and is formed with a pair of arms 24 and 26 which extend outwardly from opposite sides 27 and 28 of the grape stake. Each of arms 24 and 26 include a support arm portion 31, best seen in FIG. 1, on which a trellis wire, for example, wire 32a, may be supported.

In order to secure the first wire member 22 to grape stake 23, a wire member, generally designated 33, which preferably also is a wire member, is provided. The second wire member 33 is looped around first wire member 22 at two locations to couple the assembly 21 to post 23 in a manner which will be described in more detail hereinafter.

As shown in the drawing, trellis wire support assembly 21 is mounted to a T-post grape stake, but it will be understood that the assembly of the present invention can be mounted to grape stakes having other configurations. T-post stakes, however, include a plurality of vertically-spaced, outwardly-extending studs 34 which facilitate coupling of assembly 21 to the grape stake in a fixed vertical position.

As can be seen from FIGS. 1 and 2, second wire member 33 couples first wire member 22 to the stake such that the first wire member will be sufficiently snug against the stake so as to bear upon stud 34 at area 36 to thereby further resist any tendency of the assembly to slip down the grape stake on the vertical downward loading. The same area 36 of first wire 22 will similarly bear against the stud above if the loading is in an upward direction, although second wire member 33 can be dimensioned to cinch down on first wire 22 by an amount holding it in place vertically by reason of the circumferential forces and friction with the stake.

As shown in the drawing, it is preferable to form first wire 22 in a manner which extends around two sides of T-post 23, with the second wire 33 completing encirclement of the post on the third side thereof. It will be understood, however, that the first wire could essentially be formed in a manner so as to extend around only one side of post 23, with the second wire extending around the remaining two sides. The respective amount which each wire member extends around the grape stake is not regarded as a novel feature of the present invention.

As thus far described, trellis wire support assembly 21 of the present invention has a structure which is common to prior art goal post-type trellis wire support devices. Thus, there are two transversely-extending support arm portions 31 which are coupled to the grape stake and will support trellis wires adequately as long as the loading of the foliage is in a downward direction. In many installations, however, and under many conditions, the load on trellis wires is not always in a downward direction. As may be seen in FIG. 1, when trellis wire 32a is lifted up under grapevine member 41, the vine and foliage tends to droop outwardly away from grape stake 23. This will normally produce an outward and downward force, $F_1$, on trellis wire 32a. Such a force $F_1$ will be present in most applications and a goal post-type trellis wire support assembly will keep the trellis wire and foliage secured in an elevated position above the berries.

As seen on the right-hand side of FIG. 1, however, grape vine branch 42 is supported by trellis wire 32b. Under wind loading, as indicated by arrow W, foliage 43 acts as a sail and can trap and lift trellis wire 32b, as indicated by arrow $F_2$. Thus, there can be an upward loading force on the trellis wires induced by wind loading.

Additionally, and as best may be seen in FIG. 5, in rolling terrain, trellis wire support assembly 21 can be mounted in an inverted orientation to posts 23 located in recesses or valleys along rows of vines. The result will be that the normal force will be as illustrated on trellis wire 32a by arrow $F_3$, namely, an upward and outward force. Again, however, wind loading, as indicated by arrow W, can produce a downward force, as indicated arrow $F_4$ on trellis wire 32b. Goal post-type trellis wire support assemblies are not capable of reliably supporting trellis wires from the grape stakes under these conditions, even if inverted.

The assembly of the present invention, therefore, includes a retention arm portion 51 which extends vertically and inwardly from support arm portion 31 toward grape stake 23. As shown in FIG. 1, retention arm portion 51 is vertically spaced above support arm portion 31, and in FIG. 5 it is vertically spaced below the support arm portion.

Retention arm portion 51 extends inwardly toward grape stake 23 by an amount or distance sufficient to retain trellis wires 32a and 32b between the support arm portion and retention arm portions for both the upright mounting orientation of FIG. 1 and the inverted mounting orientation of FIG. 5. Most preferably, retention arm portion 51 extends back towards grape stake 23 by a distance at least equal to half the distance which support arm portion 41 extends outwardly of sides 27 and 28 of the grape stake. As will be seen, the retention arm portion 51 terminates in a distal end 52 which defines an opening 53 with the side 27 of grape stake 23 for receipt of trellis wires 32a and 32b. Thus, the retention arm portions 51 extend back toward the grape stake by an amount at least equal, and preferably substantially more than, a majority of the distance which the arm extends outwardly from the grape stake so that the trellis wire receiving openings 53 are positioned closely proximate opposite sides 27 and 28 of the grape stake. When the trellis wires are mounted to assembly 21, therefore, it is a simple matter to raise the wires up till they contact the stake above assembly 21 and then drop them down through openings 53 into the U-shaped arms 24 and 26, where they will be retained against both upward and downward forces.

As can be seen best in FIG. 2, it is preferable that retention arm portions 51 be relatively superimposed or in aligned relation with support arm portions 31. It will be understood, however, that such alignment for superimposition is not absolutely essential to the retention of trellis wires 32a and 32b against upward loading forces.

In connection with the removal of trellis wires, it is advantageous for the retention portions 51 to be inclined away from support arm portions 31 in a direction from the arm end toward opening 53. This will allow the trellis wires to automatically move toward openings 53, upwardly and inwardly for the conventional mounting orientation, or downwardly and inwardly for the inverted mounting orientation. This facilitates mechanical lifting of the trellis wires from the support assembly, as well as manual demounting of the trellis wires.

Mounting of trellis wire assembly 21 to grape stake 23 can best be understood by reference to FIGS. 3 and 4. Additionally, the advantages of the construction of the second wire member 33 can be described.

Referring to FIG. 4, the first step of installation of assembly 21 can be seen to be comprised of placing first wire member 22 around the T-post 23 with area 36 resting on one of studs 34. As shown in FIG. 4, second wire member 33 is an initially-open, loop member having a U-shaped end 61 that can be looped over first wire member at location 62. Member 33 can be rotated down over first wire member 22 at location 64, as indicated by arrow 66. These steps can be taken by hand. The next step is to use a pair of pliers to plastically deform end 63 by gripping leg 67 with a pair of pliers and moving it from the solid line position of FIG. 4 to the dotted line position of FIG. 4, as indicated by arrow 68. The result is the assembly shown at FIG. 1. As second wire member 33 is deformed to a closed loop at the end of the installation process, assembly 21 will be very securely attached to post 23. Moreover, the bending of leg 67 against the first wire member has the effect of cinching down first wire member around post 23.

It is preferable that the first and second wire members are both formed of spring steel. Spring steel can be plastically deformed as described in connection with mounting and demounting of the assembly. Most preferably, the first and second wire members are formed of stainless steel having a gauge in the range of about 10 to about 14 gauge, with 11 and 12 gauge being preferred.

As will be apparent, therefore, trellis wire assembly 21 of the present invention is relatively inexpensive to fabricate and to install on grape stakes. When vertical trellising is to be accomplished, the movable trellis wires can be easily lifted up to and mounted in the support assembly through openings 53. There, the trellis wires will be supported, against either upward or downward forces and retain against force reversals occurring during wind loading. The same assembly can be used for both a normal orientation and an inverted orientation on the grape stakes so as to accommodate rolling terrain.

What is claimed is:

1. In a trellis wire support assembly including a first wire member formed with a pair of arms dimensioned to extend outwardly of opposite outermost sides of a grape stake, said arms each including an outwardly-extending support arm portion for support of a trellis wire thereon and an inwardly-extending retention arm portion; and a second wire member formed for coupling to said first wire member to secure said first wire member to said grape stake, the improvement in said trellis wire support assembly comprising:

said first wire member and said second wire member combining to encircle said grape stake, and said second wire member securing said first wire member to said grape stake with said arms in a substantially fixed angular position against rotation about a longitudinal axis of said grape stake and with substantially the entire length of each of said support arm portions and the entire length of each of said retention arm portions being located outwardly of said opposite outermost sides of said grape stake;

said retention arm portions each extending inwardly from said support arm portion toward said grape stake in a vertically-spaced relation with respect to said support arm portion over an inwardly-extending distance sufficient to retain said trellis wire between said support arm portion and said retention arm portion for both an upright and an inverted mounting orientation of said trellis wire support assembly on said grape stake; and said retention arm portions each terminating in a distal end spaced outwardly from said opposite outermost sides of said grape stake to define a trellis wire-receiving opening with, and outwardly of, said opposite outermost sides of said grape stake.

2. The trellis wire support assembly as defined in claim 1 wherein, said second wire member is an initially open loop wire member formed from a plastically-deformable wire and having a U-shaped end for looping over said first wire member at one location and an opposite L-shaped end for swinging over said first wire member at another location and plastically bending back to said U-shaped end to form a closed loop to secure said first wire member to said grape stake.

3. The trellis wire support assembly as defined in claim 1 wherein, said retention arm portions are inclined from said support arm portion in a direction toward said trellis wire-receiving opening at an angle having a smaller vertical rise to horizontal run.

4. A grape trellising assembly comprising:

a grape stake;

a trellis wire;

a trellis wire support assembly including a first wire member having a pair of support arms dimensioned to extend outwardly from opposite sides of said grape stake, and a second wire member coupled to said first wire member to encircle said grape stake with said first wire member and secure said support assembly in an elevated position on, and at an angularly fixed position about a longitudinal axis of, said grape stake;

said first wire member having oppositely extending support arm portions extending outwardly from Opposite outermost sides of said grape stake and having retention arm portions extending vertically and inwardly toward said grape stake from said support arm portions in spaced substantially aligned relation to said support arm portions to retain said trellis wire therein against both upward and downward displacement of said trellis wire, said retention arm portions each having a length slightly less than said support arm portions and terminating in distal ends positioned closely proximate and outwardly of said opposite outermost sides of said grape stake to define therewith trellis wire-receiving openings outwardly of said opposite outermost sides; and said trellis wire being mounted through one of said openings and supported on one of said support arms by one of said support arm portions and said retention arm portions.

* * * * *